United States Patent
Gunji (10) Patent No.: US 11,813,894 B2
(45) Date of Patent: Nov. 14, 2023

(54) TIRE

(71) Applicant: The Yokohama Rubber Co., LTD., Tokyo (JP)

(72) Inventor: Ryota Gunji, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 326 days.

(21) Appl. No.: 17/173,707

(22) Filed: Feb. 11, 2021

(65) Prior Publication Data

US 2021/0252917 A1   Aug. 19, 2021

(30) Foreign Application Priority Data

Feb. 17, 2020   (JP) .................................. 2020-024776

(51) Int. Cl.
| | |
|---|---|
| *B60C 11/117* | (2006.01) |
| *B60C 11/13* | (2006.01) |
| *B60C 11/03* | (2006.01) |

(52) U.S. Cl.
CPC ........ *B60C 11/1353* (2013.01); *B60C 11/032* (2013.01); *B60C 11/033* (2013.01); *B60C 2011/036* (2013.01); *B60C 2011/0346* (2013.01); *B60C 2011/0362* (2013.01); *B60C 2011/0365* (2013.01)

(58) Field of Classification Search
CPC ........... B60C 11/032; B60C 2011/0362; B60C 11/13; B60C 11/1353; B60C 11/1376
See application file for complete search history.

(56) References Cited

U.S. PATENT DOCUMENTS

| | | | | |
|---|---|---|---|---|
| 5,031,680 | A | * | 7/1991 | Kajikawa .............. B60C 11/033 152/902 |
| 2004/0238092 | A1 | * | 12/2004 | Colombo ............ B60C 11/1384 152/209.15 |
| 2005/0109437 | A1 | * | 5/2005 | Shirouzu ............. B60C 11/1376 152/209.15 |
| 2008/0092999 | A1 | * | 4/2008 | Miyazaki .............. B60C 11/032 152/209.15 |
| 2008/0105348 | A1 | * | 5/2008 | Byrne ................... B60C 11/032 425/28.1 |
| 2010/0236680 | A1 | * | 9/2010 | Mukai ................... B60C 11/032 152/209.16 |
| 2018/0079259 | A1 | * | 3/2018 | Kaneko ................. B60C 11/032 |

(Continued)

FOREIGN PATENT DOCUMENTS

| | | |
|---|---|---|
| EP | 3116724 B1 | 1/2017 |
| FR | 1301402 A * | 8/1962 |

(Continued)

OTHER PUBLICATIONS

Machine Translation: JP-10272905-A, Ishikawa J, (Year: 2023).*

(Continued)

*Primary Examiner* — Kendra Ly
(74) *Attorney, Agent, or Firm* — Thorpe North & Western (57) ABSTRACT

A tire includes a narrow shallow grooved region on a land portion defined by a circumferential main groove. The narrow shallow grooved region includes a plurality of narrow shallow grooves that are not open to the circumferential main groove. A ratio of a total area of the narrow shallow grooved region to a ground contact area of the land portion is not less than 0.05 and not greater than 0.60.

17 Claims, 5 Drawing Sheets

(56) References Cited

U.S. PATENT DOCUMENTS

| | | | |
|---|---|---|---|
| 2018/0236819 A1* | 8/2018 | Nakajima | B60C 11/0306 |
| 2019/0176527 A1* | 6/2019 | Yasunaga | B60C 11/0302 |
| 2019/0366773 A1* | 12/2019 | Vaissaud | B60C 11/1259 |
| 2019/0366776 A1 | 12/2019 | Lo | |

FOREIGN PATENT DOCUMENTS

| | | | | |
|---|---|---|---|---|
| JP | H06-191234 | | 7/1994 | |
| JP | 10272905 A | * | 10/1998 | B60C 11/032 |
| JP | 2002046424 A | * | 2/2002 | |
| JP | 2007182133 A | * | 7/2007 | B60C 11/032 |
| JP | 2012035664 A | * | 2/2012 | B60C 11/1376 |

OTHER PUBLICATIONS

Machine Translation: FR1301402A, N/A, (Year: 2023).*
Machine Translation: JP-2007182133-A, Sato K, (Year: 2023).*
Machine Translation: JP-2002046424-A, Takahashi F, (Year: 2023).*
Machine Translation: JP-2012035664-A, Hayashi T, (Year: 2023).*

* cited by examiner

TIRE

CROSS-REFERENCE TO RELATED APPLICATIONS

This application claims priority pursuant to 35 U.S.C. 119(a) of Japan Patent Application No. 2020-024776, filed Feb. 17, 2020, which application is incorporated herein by reference.

FIELD OF THE INVENTION

The present technology relates to a tire.

BACKGROUND

In general, as for a European tire, while rolling resistance performance is regarded as important, high snow traction performance is regarded as important. These kinds of performance are also regarded as important not only for a tire mountable on a rim of a drive shaft, but also for a tire mountable on a rim of a trailer shaft. To improve snow traction performance, a pattern in which a lug groove and a sipe are provided in a rib pattern may be employed.

Technology in which a recess/protrusion is provided in a surface of a tire is described in European Patent Application Publication No. 3116724. The technology described in European Patent Application Publication No. 3116724 can provide improved aesthetic appearance of a tire.

A serration that is open to a main groove is provided in a tread portion of a tire described in European Patent Application Publication No. 3116724. Since the tire described in European Patent Application Publication No. 3116724 includes the serration, the aesthetic appearance of the tire can be improved. However, the tire described in European Patent Application Publication No. 3116724 has room for enhancement in improving rolling resistance performance and snow traction performance and in maintaining wet grip performance.

BRIEF SUMMARY

The present technology provides a tire that can provide improved rolling resistance performance, improved snow traction performance, and improved wet grip performance in a well-balanced manner.

A tire according to an aspect of the present technology is a tire including a narrow shallow grooved region on a land portion defined by a main groove, the narrow shallow grooved region including a plurality of narrow shallow grooves that are not open to the main groove, and a ratio S1/SC of total area S1 of the narrow shallow grooved region to ground contact area SC of the land portion being not less than 0.05 and not greater than 0.60.

Preferably, a groove width of each of the plurality of narrow shallow grooves is not less than 1.0 mm and not greater than 3.0 mm.

Preferably, a groove depth of each of the plurality of narrow shallow grooves is not less than 1.0 mm and not greater than 4.0 mm.

Preferably, a ratio of a maximum groove depth of the plurality of narrow shallow grooves to a groove depth of the main groove is not less than 0.05 and not greater than 0.2.

Preferably, a ratio of a maximum groove length of the plurality of narrow shallow grooves to a maximum width of the land portion is not less than 0.1 and not greater than 0.8.

Preferably, a pitch length of the plurality of narrow shallow grooves is not less than 1.1 times and not greater than 3.0 times the groove width of each of the plurality of narrow shallow grooves.

Preferably, a distance from an end portion of the land portion to each of the plurality of narrow shallow grooves is not less than 3 mm.

Preferably, an angle formed between a groove center line of each of the plurality of narrow shallow grooves and a tire circumferential direction is not less than 45° and not greater than 90°.

Preferably, in a cross-sectional shape along a direction orthogonal to an extension direction of each of the plurality of narrow shallow grooves, an angle of a groove wall of each of the plurality of narrow shallow grooves with respect to a tire radial direction is not less than 15° and not greater than 45°.

Preferably, a recess portion region having a depth in a tire radial direction from a ground contact surface of the land portion is provided, and the plurality of narrow shallow grooves are provided in an inner side of the recess portion region.

Preferably, a lug groove extending through the land portion in a tire width direction is provided, and the plurality of narrow shallow grooves are provided in diagonally opposing regions of a block defined by the main groove and the lug groove, among four regions formed by a midline connecting midpoints at which two opposing sides along the main groove of the block are bisected and a midline connecting midpoints at which two opposing sides along the lug groove of the block are bisected.

Preferably, the plurality of narrow shallow grooves differ from each other in a length, and a longest narrow shallow groove of the plurality of narrow shallow grooves is disposed closer to a side along the lug groove than a shortest narrow shallow groove, and the plurality of narrow shallow grooves are arranged having lengths gradually decreasing from the longest narrow shallow groove to the shortest narrow shallow groove.

Preferably, the narrow shallow grooved region has a substantially triangular shape, and the block has a polygonal shape having an obtuse corner portion, and two sides of the substantially triangular shape of the narrow shallow grooved region are provided along two sides forming the obtuse corner portion.

Preferably, the block has other obtuse corner portion at a position opposing a position of the obtuse corner portion, and two sides of other narrow shallow grooved region having a substantially triangular shape are provided along two sides forming the other obtuse corner portion.

Preferably, the narrow shallow grooved region and the other narrow shallow grooved region differ from each other in area, and in the block, the narrow shallow grooved region having small area is provided at a position closer to a tire equator line than the narrow shallow grooved region having large area.

Preferably, a ratio of area of the narrow shallow grooved region having the small area to area of the narrow shallow grooved region having the large area is not less than 0.3 and not greater than 0.7.

The tire according to an embodiment of the present technology has an effect of being able to provide improved rolling resistance performance, improved snow traction performance, and improved wet grip performance in a well-balanced manner.

DETAILED DESCRIPTION

Embodiments of the present technology will be described in detail below with reference to the drawings. In each of the embodiments described below, identical or equivalent components to those of other embodiments are denoted by identical reference signs, and description of those components will be simplified or omitted. An embodiment of the present technology is not limited by each of the embodiments. Additionally, constituents of each of the embodiments include constituents that can be substituted and easily conceived by one skilled in the art, or constituents that are substantially identical. Note that it is possible to combine configurations described below as appropriate. Additionally, omission, substitution, or modification of a configuration can be carried out without departing from the scope of the technology.

Embodiments

In the following description, tire radial direction refers to a direction orthogonal to a rotation axis (not illustrated) of a tire 1, inner side in the tire radial direction refers to a side facing the rotation axis in the tire radial direction, and outer side in the tire radial direction refers to a side away from the rotation axis in the tire radial direction. Additionally, tire circumferential direction refers to a circumferential direction with the rotation axis as a central axis. Additionally, tire width direction refers to a direction parallel with the rotation axis, inner side in the tire width direction refers to a side toward a tire equatorial plane (tire equator line) CL in the tire width direction, and outer side in the tire width direction refers to a side away from the tire equatorial plane CL in the tire width direction. Tire equatorial plane CL refers to a plane that is orthogonal to the rotation axis of the tire 1 and that passes through the center of the tire width of the tire 1, and in the tire equatorial plane CL, a center line in the tire width direction that is a center position in the tire width direction of the tire 1 coincides with a position in the tire width direction. Tire width is the width in the tire width direction between portions located in an outermost side in the tire width direction, in other words, the distance between portions that are the most distant from the tire equatorial plane CL in the tire width direction. Tire equator line refers to a line on the tire equatorial plane CL and along the tire circumferential direction of the tire 1. In the present embodiment, the tire equator line and the tire equatorial plane are denoted by an identical reference sign "CL".

Figure 1:
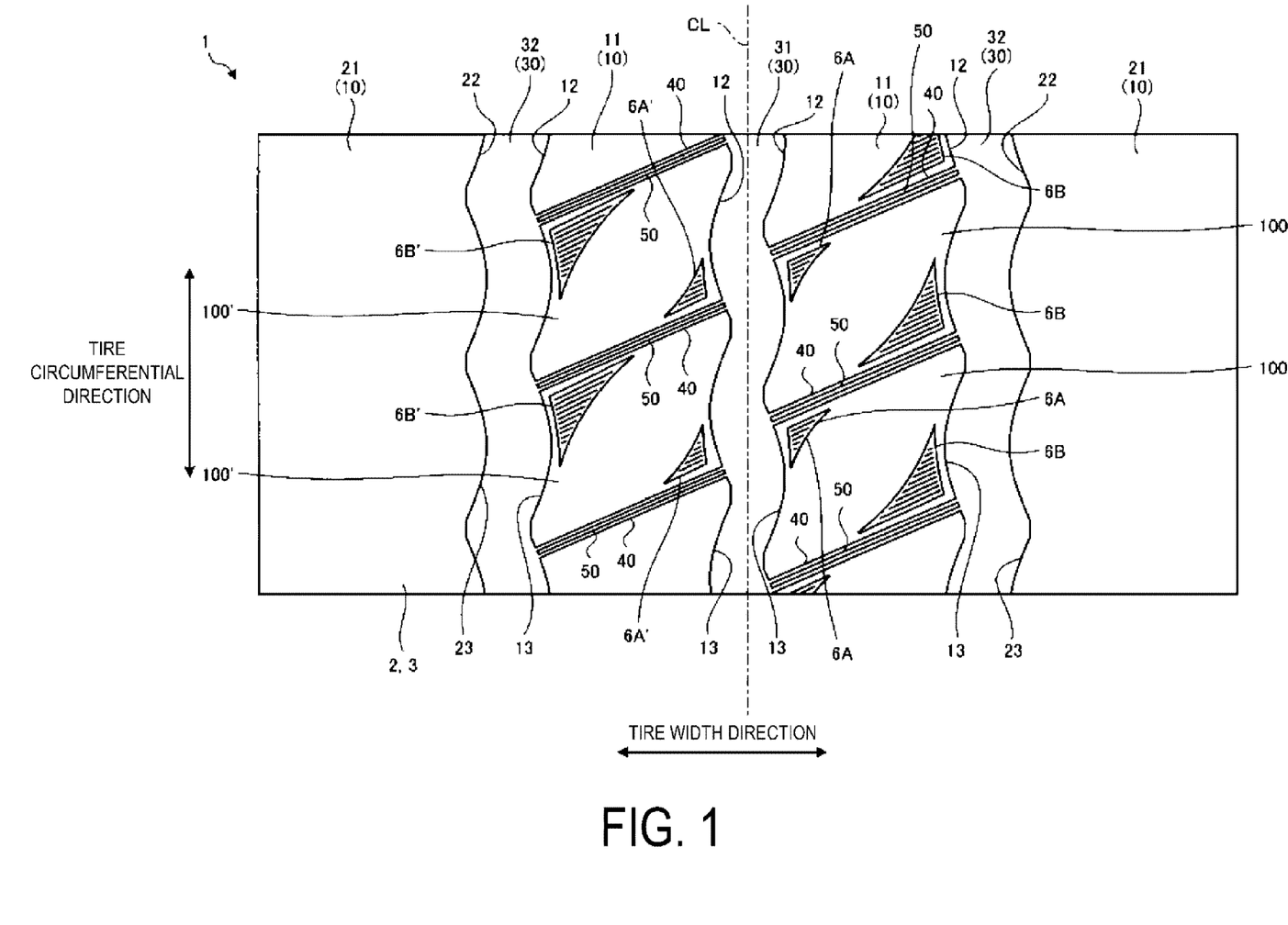
FIG. 1 is a plan view illustrating a tread contact surface of a tire according to an embodiment.

FIG. 1 is a plan view illustrating a tread contact surface 3 of the tire 1 according to an embodiment. The tire 1 according to the present embodiment is preferably a pneumatic tire, and inert gas such as nitrogen, argon, and helium in addition to ordinary air or air having adjusted oxygen partial pressure can be used as gas filling the tire.

The tire 1 illustrated in FIG. 1, a tread portion 2 is disposed in a portion that is an outermost side in the tire radial direction. The tread contact surface 3 of the tread portion 2, in other words, a portion that comes into contact with a road surface during traveling of a vehicle (not illustrated) on which the tire 1 is mountable is formed as the tread contact surface 3. In the tread contact surface 3, a plurality of circumferential main grooves 30 extending in the tire circumferential direction and a plurality of lateral grooves 40 extending in the tire width direction are formed. In the tread contact surface 3, a plurality of land portions 10 are defined by the plurality of circumferential main grooves 30 and the plurality of lateral grooves 40.

In the present embodiment, three circumferential main grooves 30 are formed side by side in the tire width direction. The three circumferential main grooves 30 include one center circumferential main groove 31 disposed on the tire equatorial plane CL and two outermost circumferential main grooves 32 disposed on both sides in the tire width direction of the center circumferential main groove 31, respectively. Among these, each of the outermost circumferential main grooves 32 is located in the outermost side in the tire width direction among the plurality of circumferential main grooves 30. Additionally, each of the lateral grooves 40 that are lug grooves is disposed between the circumferential main grooves 30 adjacent to each other in the tire width direction. Both ends of the lateral groove 40 are open to the circumferential main grooves 30. In other words, each of the lateral grooves 40 is disposed between the center circumferential main groove 31 and the outermost circumferential main groove 32 that are adjacent to each other in the tire width direction. The lateral groove 40 extends in the tire width direction through the land portion between the circumferential main grooves 30. An end portion in an inner side in tire width direction of the lateral groove 40 is open to the center circumferential main groove 31. An end portion in an outer side in tire width direction of the lateral groove 40 is open to the outermost circumferential main groove 32.

Here, circumferential main grooves 30 each refers to a longitudinal groove including at least a portion extending in the tire circumferential direction. In general, each of the circumferential main grooves 30 has a groove width of not less than 5.0 mm and a groove depth of not less than 10.0 mm, and includes a tread wear indicator (skid sign) inside indicating terminal stages of wear. In the present embodiment, the circumferential main groove 30 has a groove width of not less than 10.0 mm and a groove depth of not less than 11.0 mm.

Additionally, the groove width of the lateral groove 40 is narrower than the groove width of the circumferential main groove 30. The groove width of the lateral groove 40 is in the range of not less than 0.5 mm and not greater than 5.0 mm, for example. The groove width of the lateral groove 40 is preferably in the range of not less than 0.5 mm and not greater than 3.0 mm. Additionally, the groove depth of the lateral groove 40 is in the range of not less than 1.0 mm and not greater than 4.0 mm. In the present embodiment, the lateral groove 40 is inclined in the tire circumferential direction with respect to the tire width direction, while extending in the tire width direction.

A sipe 50 is disposed in a groove bottom 42 of the lateral groove 40. The groove width of the sipe 50 is narrower than the groove width of the lateral groove 40. The groove width of the sipe 50 is in the range of not less than 0.5 mm and not greater than 1.0 mm. The sipe 50 formed in this manner is disposed throughout the lateral groove 40. In other words, as with the lateral groove 40, both ends of the sipe 50 are open to the circumferential main grooves 30. Note that in a case where the groove width of the lateral groove 40 and the groove width of the sipe 50 are identical, a portion from the tread contact surface 3 to a position of a bottom portion of the sipe 50 is substantially formed by the lateral groove 40 or the sipe 50.

In the tread contact surface 3, the plurality of land portions 10 are formed by the plurality of circumferential main grooves 30 and the plurality of lateral grooves 40. Each of the land portions 10 includes a center land portion 11 and a shoulder land portion 21. Among these, the center land portion 11 is the land portion 10 including both sides in the tire width direction defined by the circumferential main grooves 30. In other words, the center land portion 11 is disposed between the center circumferential main groove 31 and the outermost circumferential main groove 32 that are adjacent to each other in the tire width direction. An inner side in the tire width direction of the center land portion 11 is defined by the center circumferential main groove 31, and an outer side in the tire width direction of the center land portion 11 is defined by the outermost circumferential main groove 32.

The lateral groove 40 including the both ends that are open to the center circumferential main groove 31 and the outermost circumferential main groove 32 is disposed between the center circumferential main groove 31 and the outermost circumferential main groove 32 that are adjacent to each other in the tire width direction. Thus, both sides in the tire circumferential direction of the center land portion 11 are defined by the lateral grooves 40. Thus, both sides in the tire width direction of the center land portion 11 are defined by the circumferential main grooves 30 and the both sides in the tire circumferential direction of the center land portion 11 are defined by the lateral grooves 40. Accordingly, the center land portion 11 has a block shape. A plurality of the center land portions 11 each formed in a block shape in this manner are disposed side by side in the tire circumferential direction between the center circumferential main groove 31 and the outermost circumferential main groove 32 that are adjacent to each other in the tire width direction.

Additionally, the shoulder land portion 21 is disposed in an outer side in the tire width direction of the outermost circumferential main groove 32. An inner side in the tire width direction of the shoulder land portion 21 is defined by the outermost circumferential main groove 32, and an outer side in the tire width direction of the shoulder land portion 21 is defined by an end portion of the tread portion 2. The lateral groove 40 that is open to an outer side in tire width direction of the outermost circumferential main groove 32 and the end portion of the tread portion 2 is not disposed. Thus, the shoulder land portion 21 in the present embodiment is formed in a rib shape continuous in the tire circumferential direction.

In the present embodiment, a total of four rows of the land portions are disposed including two land portion rows including the plurality of center land portions 11 disposed side by side in the tire width direction in the both sides in the tire width direction of the center circumferential main groove 31 as described above, and the shoulder land portion 21 disposed in the outer side in the tire width direction of each of the two outermost circumferential main grooves 32 and extending in the tire circumferential direction.

Among the land portions 10 formed as described above, the center land portion 11 includes an edge 12 formed by the circumferential main groove 30, and the edge 12 includes a recess portion 13 recessed in a direction away from the land portion 10 opposing via the circumferential main groove 30. In other words, the edge 12 in a side defined by the center circumferential main groove 31 in the center land portion 11 includes the recess portion 13 recessed in a direction away from the center land portion 11 opposing via the center circumferential main groove 31. Additionally, the edge 12 in a side defined by the outermost circumferential main groove 32 in the center land portion 11 includes the recess portion 13 recessed in a direction away from the shoulder land portion 21 opposing via the outermost circumferential main groove 32. In other words, the center land portion 11 is formed including the edges 12 in both sides in the tire width direction of the center land portion 11, and each of the edges 12 includes the recess portion 13.

Additionally, since each of the edges 12 of the center land portion 11 located in both sides in the groove width direction of the center circumferential main groove 31 and defined by the center circumferential main groove 31 includes the recess portion 13, each of the edges 12 located in the both sides in the groove width direction of the center circumferential main groove 31 and opposing each other includes the recess portion 13. In other words, the recess portions 13 opposing each other are formed in the both sides in the groove width direction of the center circumferential main groove 31.

On the other hand, the shoulder land portion 21 includes a protrusion portion 23 that includes an edge 22 formed by the circumferential main groove 30 and projecting in a direction in which the land portion 10 opposing via the circumferential main groove 30 is located. In other words, the edge 22 formed by the outermost circumferential main groove 32 in the shoulder land portion 21 includes the protrusion portion 23 that projects in a direction in which the center land portion 11 opposing via the outermost circumferential main groove 32 is located. In other words, the protrusion portion 23 of the edge 22 of the shoulder land portion 21 is formed to project toward the inner side in the tire width direction.

Each block forming the center land portion 11 includes narrow shallow grooved regions 6A and 6A' and narrow shallow grooved regions 6B and 6B'. The narrow shallow grooved region 6A and the narrow shallow grooved region 6B provided in a block 100 differ from each other in area. Area S6A of the narrow shallow grooved region 6A is smaller than area S6B of the narrow shallow grooved region 6B. In the tire width direction, the narrow shallow grooved region 6A is provided at a position closer to the tire equator line CL than the narrow shallow grooved region 6B. In other words, the narrow shallow grooved region 6A and the other narrow shallow grooved region 6B differ from each other in area, and in the block 100, the narrow shallow grooved region 6A having small area is provided at a position closer to the tire equator line CL than the narrow shallow grooved region 6B having large area. A ratio of the area of the narrow shallow grooved region 6A with small area to the area of the narrow shallow grooved region 6B having large area is preferably not less than 0.3 and not greater than 0.7.

The narrow shallow grooved region 6A' and the narrow shallow grooved region 6W provided in a block 100' differ from each other in area. Area S6A' of the narrow shallow grooved region S6A' is smaller than area S6B' of the narrow shallow grooved region 6W. In the tire width direction, the narrow shallow grooved region 6A' is provided at a position closer to the tire equator line CL than the narrow shallow grooved region 6W. In other words, the narrow shallow grooved region 6A' and the other narrow shallow grooved region 6B' differ from each other in area, and in the block 100', the narrow shallow grooved region 6A' having small area is provided at a position closer to the tire equator line CL than the narrow shallow grooved region 6B' having large area. A ratio of the area of the narrow shallow grooved region 6A' having small area to the area of the narrow shallow grooved region 6W having large area is preferably not less than 0.3 and not greater than 0.7.

Figure 2:
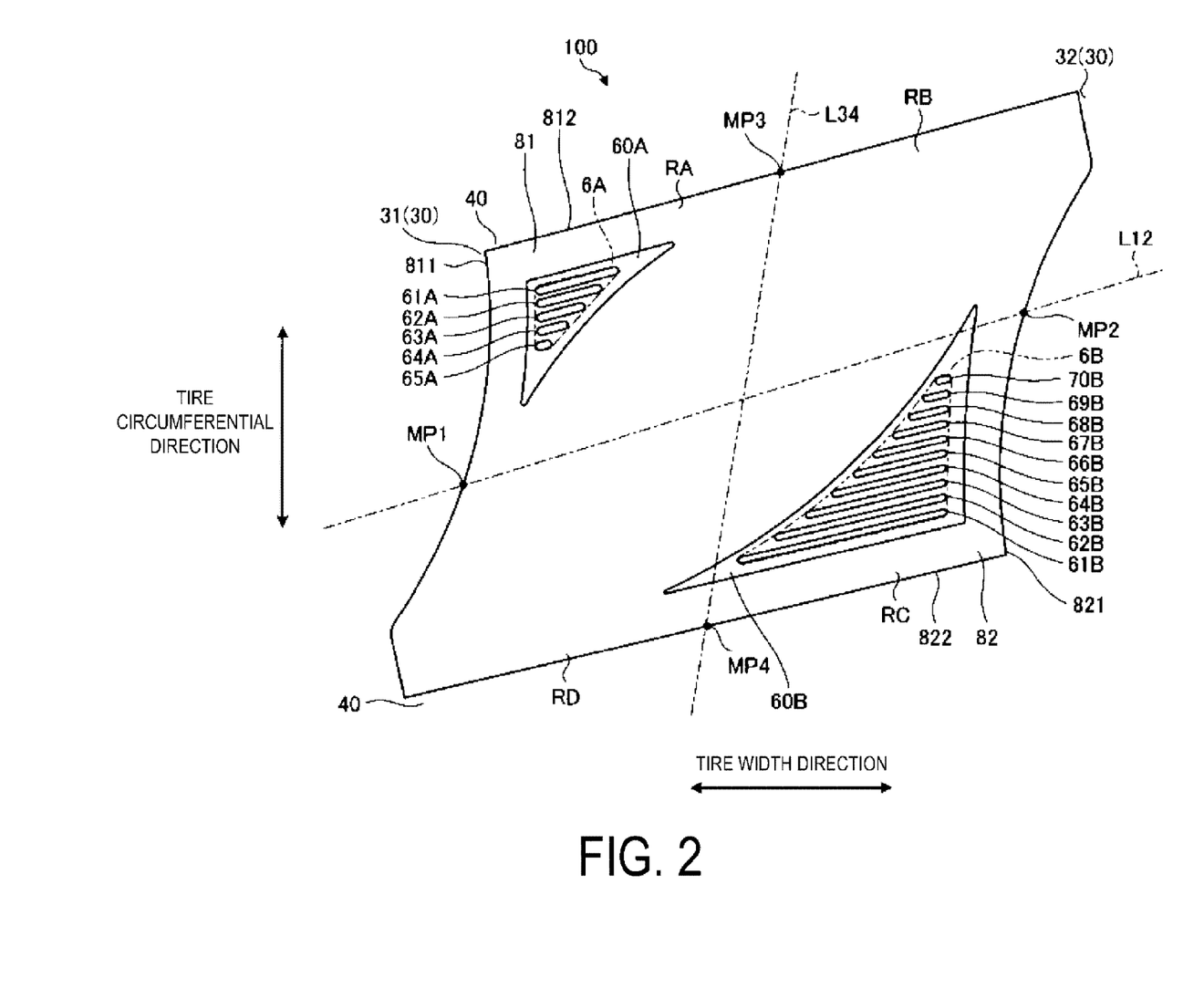
FIG. 2 is an enlarged diagram of a block 100 in FIG. 1.

FIG. 2 is an enlarged diagram of the block 100 in FIG. 1. The block 100 is defined by the two lateral grooves 40 and 40 and the circumferential main grooves 30 and 30. As illustrated in FIG. 2, the block 100 has a substantially parallelogram shape.

An obtuse corner portion 81 and an obtuse corner portion 82 are provided at positions opposing each other in the substantially parallelogram shape of the block 100. In other words, the obtuse corner portion 82 is provided at a position opposing the obtuse corner portion 81 in the substantially parallelogram shape of the block 100. Then, a recess portion region 60A and a recess portion region 60B are provided at the positions of the obtuse corner portion 81 and the obtuse corner portion 82, respectively. The recess portion region 60A and the recess portion region 60B are provided, and accordingly, the visibility of the narrow shallow groove can be increased more effectively, and a wear rate is easily determined. Note that the obtuse corner portion 81 is a corner portion formed by a side 811 and a side 812 of the substantially parallelogram shape of the block 100. The obtuse corner portion 82 is a corner portion formed by a side 821 and a side 822 of the substantially parallelogram shape of the block 100.

The recess portion region 60A is a region having the depth in the tire radial direction from a surface of the block 100 that is a land portion, in other words, a ground contact surface. The recess portion region 60A is a region that does not come into contact with the ground. Five narrow shallow grooves 61A, 62A, 63A, 64A, and 65A are provided in the recess portion region 60A. The narrow shallow grooves 61A, 62A, 63A, 64A, and 65A are not open to the circumferential main groove 30. The recess portion region 60A is provided, and accordingly, the depth of each of the narrow shallow grooves 61A, 62A, 63A, 64A, and 65A can be made shallower than the case where the recess portion region 60A is not provided, and there is an effect of preventing the narrow shallow groove from becoming a starting point of a crack.

The recess portion region 60B is a region having a depth in the tire radial direction from the surface of the block 100 that is a land portion, in other words, the ground contact surface. The recess portion region 60B is a region that does not come into contact with the ground. Ten narrow shallow grooves 61B, 62B, 63B, 64B, 65B, 66B, 67B, 68B, 69B, and 70B are provided in the recess portion region 60B. The narrow shallow grooves 61B, 62B, 63B, 64B, 65B, 66B, 67B, 68B, 69B, and 70B are not open to the circumferential main groove 30. The recess portion region 60B is provided, and accordingly, the depth of each of the narrow shallow grooves 61B, 62B, 63B, 64B, 65B, 66B, 67B, 68B, 69B, and 70B can be made shallower than the case where the recess portion region 60B is not provided, and there is an effect of preventing the narrow shallow groove from becoming a starting point of a crack.

Here, a region surrounded by an imaginary line connecting end portions of a group of adjacent narrow shallow grooves is defined as a narrow shallow grooved region. The narrow shallow grooved region 6A is a region surrounded by an imaginary line (dot-dash line in the diagram) connecting end portions of a group of the narrow shallow grooves 61A to 65A adjacent. Additionally, the narrow shallow grooved region 6B is a region surrounded by an imaginary line (dot-dash line in the diagram) connecting end portions of a group of the narrow shallow grooves 61B to 70B adjacent.

Figure 3:
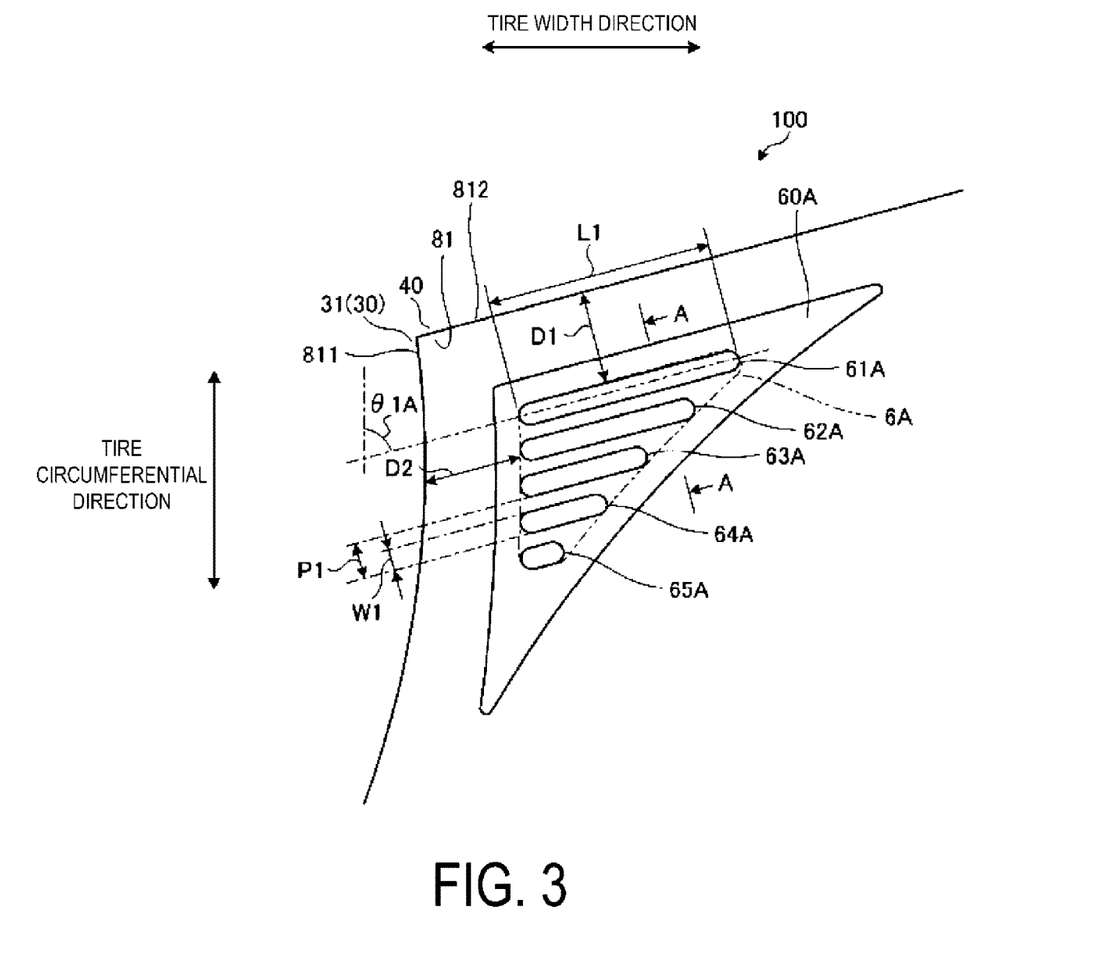
FIG. 3 is an enlarged diagram at or near a narrow shallow grooved region of a block.

FIG. 3 is an enlarged diagram at or near the narrow shallow grooved region 6A of the block 100. As illustrated in FIG. 3, the narrow shallow grooved region 6A is provided in an inner side of the recess portion region 60A. The five narrow shallow grooves 61A to 65A forming the narrow shallow grooved region 6A differ from each other in the length. The narrow shallow groove 61A that is the longest is disposed closer to the side 812 along the lateral groove 40 of the block 100 than the narrow shallow groove 65A that is the shortest. The narrow shallow grooves 61A to 65A are arranged having the lengths gradually decreasing from the narrow shallow groove 61A that is the longest to the narrow shallow groove 65A that is the shortest. The longer narrow shallow groove is disposed in an end portion of the block 100 where ground contact pressure is high, and accordingly, rolling resistance performance can be improved effectively. Note that the groove length of the narrow shallow groove 65A having the shortest groove length is, for example, 1.0 mm.

As illustrated in FIG. 3, the narrow shallow grooved region 6A has a substantially triangular shape. Two sides of the substantially triangular shape of the narrow shallow grooved region 6A are provided along the side 811 and the side 812 that form the obtuse corner portion 81.

A groove width W1 of each of the five narrow shallow grooves 61A to 65A is preferably not less than 1.0 mm and not greater than 3.0 mm. When the groove width W1 is in this range, snow traction performance and rolling resistance performance can be improved. When the groove width W1 is too narrow, the groove closes when the tire 1 comes into contact with the ground, and no snow traction performance is obtained, and thus this is not preferable. When the groove width W1 is too wide, ground contact pressure on the block 100 is biased, and rolling resistance performance degrades, and thus this is not preferable.

A ratio of the maximum groove length of the five narrow shallow grooves 61A to 65A to the maximum width of the center land portion 11 (see FIG. 1) is preferably not less than 0.1 and not greater than 0.8. In the present embodiment, a ratio of a length L1 of the narrow shallow groove 61A that is the longest to the maximum width of the center land portion 11 is preferably not less than 0.1 and not greater than 0.8, and more preferably not less than 0.4 and not greater than 0.5. When the maximum groove length of the narrow shallow grooves is in this range, snow traction performance can be increased. When the narrow shallow groove is short, snow traction performance cannot be obtained, and thus this is not preferable. The length of each of the narrow shallow grooves 61A to 65A is the length of a groove center line. In a case where the narrow shallow grooves 61A to 65A are curved, the length of the groove center line along the curvature is the length of each of the narrow shallow grooves.

A pitch length P1 of arrangement of the five narrow shallow grooves 61A to 65A is preferably not less than 1.1 times and not greater than 3.0 times the groove width W1 of each of the narrow shallow grooves. When the pitch length P1 is small, a chip or a crack in a mold side is generated, and thus this is not preferable. When the pitch length P1 is large, the number of the narrow shallow grooves decreases and snow traction performance cannot be obtained, and thus this is not preferable. The pitch length P1 is more preferably not less than 1.3 times and not greater than 1.8 times.

The distance from the end portion of the block 100 that is a land portion to each of the narrow shallow grooves 61A to 65A is preferably not less than 3 mm. In other words, in FIG. 3, a distance D1 from the side 812 to the narrow shallow groove 61A that is the closest is preferably not less than 3 mm. Additionally, a distance D2 from the side 811 to each of the narrow shallow grooves 61A to 65A is preferably not less than 3 mm. When the narrow shallow groove is disposed at a position close to the end portion of the block 100 and the circumferential main groove 30, a crack is generated from an end portion of the narrow shallow groove, and thus this is not preferable.

An angle θ1A formed between the groove center line of each of the narrow shallow grooves 61A to 65A and the tire circumferential direction, in other words, an extension angle of each of the narrow shallow grooves, is preferably not less than 45° and not greater than 90°. When the angle is in this range, the edge components in the tire width direction can be increased, and good snow traction performance can be obtained. To obtain better snow traction performance, the angle θ1A is more preferably not less than 60° and not greater than 90°.

As illustrated in FIG. 3, the recess portion region 60A has a substantially triangular shape. Two sides of the substantially triangular shape of the recess portion region 60A are provided along the side 811 and the side 812 that form the obtuse corner portion 81. A ratio S0A/S6A of area S0A of the recess portion region 60A to the area S6A of the narrow shallow grooved region 6A is preferably not less than 1.0 and not greater than 4.0.

Figure 4:
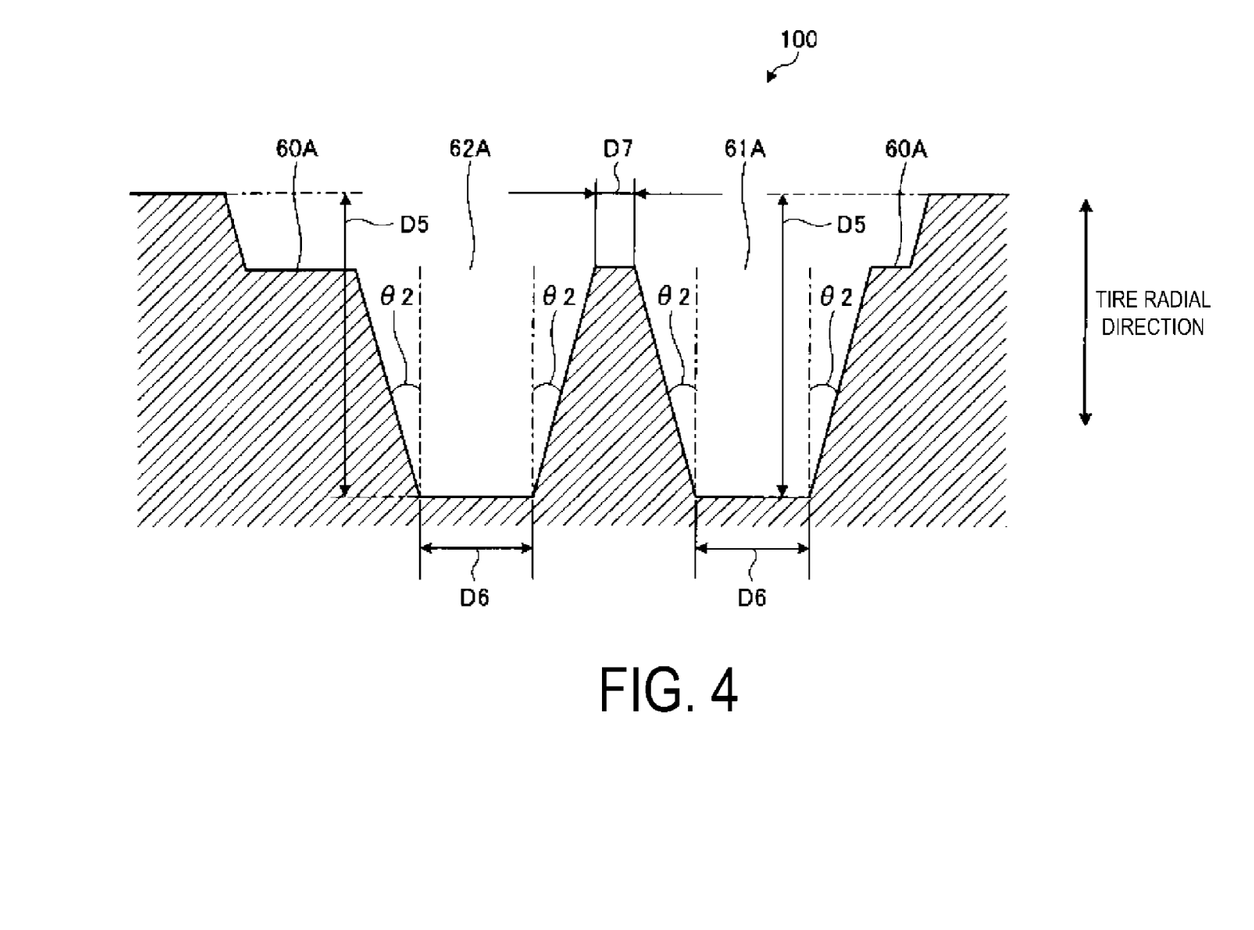
FIG. 4 is a cross-sectional view taken along line A-A of FIG. 3.

Here, FIG. 4 is a cross-sectional view taken along line A-A of FIG. 3. FIG. 4 illustrates a cross-sectional shape along a direction orthogonal to the extension direction of each of the narrow shallow groove 61A and the narrow shallow groove 62A. In FIG. 4, an angle θ2 of each of groove walls of the narrow shallow groove 61A and the narrow shallow groove 62A with respect to the tire radial direction, in other words, a groove wall angle of each of the narrow shallow grooves is preferably not less than 15° and not greater than 45°. When the angle θ2 is too small, mold durability deteriorates, and thus this is not preferable. When the angle is too large, the preferable range of the pitch length P1 cannot be maintained, and thus this is not preferable.

Additionally, in FIG. 4, a ratio of a maximum value of a groove depth D5 from a ground contact surface of the block 100 to a groove bottom of each of the narrow shallow grooves 61A and 62A to the groove depth of the circumferential main groove 30 is preferably not less than 0.05 and not greater than 0.2. The same applies to the other narrow shallow grooves 63A to 65A. The groove depth of each of the narrow shallow grooves 61A and 62A is preferably not less than 1.0 mm and not greater than 4.0 mm. The same applies to the other narrow shallow grooves 63A to 65A. The groove depths of the narrow shallow grooves 61A to 65A may be constant or may differ. When the groove depth of each of the narrow shallow grooves 61A to 65A is in this range, snow traction performance can be improved. When the groove depth is shallow, snow traction performance cannot be improved. Note that the groove depth of each of the narrow shallow grooves 61A to 65A may be constant or differ in one narrow shallow groove.

Note that in FIG. 4, a width D6 of the groove bottom of each of the narrow shallow grooves 61A and 62A is 0.3 mm, for example. A distance D7 in a direction orthogonal to the extension direction of each of the narrow shallow groove 61A and the narrow shallow groove 62A is 0.1 mm, for example. The same applies to the width of the groove bottom of each of the other narrow shallow grooves and the distance in a direction orthogonal to the extension direction of each of the narrow shallow grooves.

Figure 5:
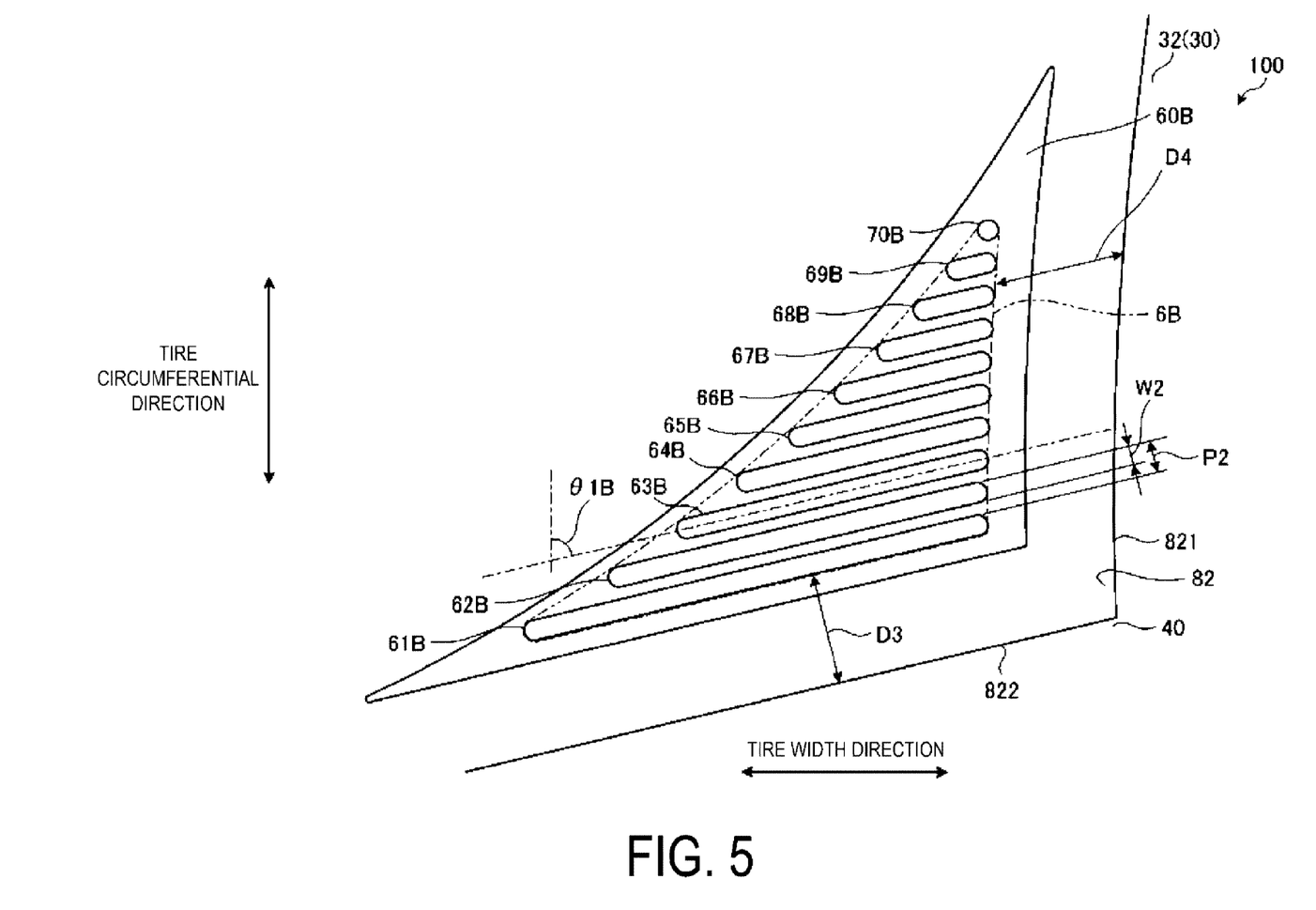
FIG. 5 is an enlarged diagram at or near a narrow shallow grooved region of a block.

FIG. 5 is an enlarged diagram at or near the narrow shallow grooved region 6B of the block 100. As illustrated in FIG. 5, the narrow shallow grooved region 6B is provided in an inner side of the recess portion region 60B. The ten narrow shallow grooves 61B to 70B that form the narrow shallow grooved region 6B differ from each other in the length. The narrow shallow groove 61B that is the longest is disposed closer to the side 822 along the lateral groove 40 of the block 100 than the narrow shallow groove 70B that is the shortest. The narrow shallow grooves 61B to 70B are arranged having the lengths gradually decreasing from the narrow shallow groove 61B that is the longest to the narrow shallow groove 70B that is the shortest. The longer narrow shallow groove is disposed in the end portion of the block 100 where ground contact pressure is high, and accordingly, rolling resistance performance can be improved effectively. Note that the groove length of the narrow shallow groove 70B having the shortest groove length is, for example, 1.0 mm.

As illustrated in FIG. 5, the narrow shallow grooved region 6B has a substantially triangular shape. Two sides of the substantially triangular shape of the narrow shallow grooved region 6B are provided along the side 821 and the side 822 that form the obtuse corner portion 82.

A groove width W2 of each of the ten narrow shallow grooves 61B to 70B is preferably not less than 1.0 mm and not greater than 3.0 mm. Additionally, as with the narrow shallow grooves 61A to 65A described with reference to FIG. 4, a ratio of the maximum value of the groove depths of the ten narrow shallow grooves 61B to 70B to the groove depth of the circumferential main groove 30 is preferably not less than 0.05 and not greater than 0.2. The groove depth of each of the narrow shallow grooves 61B to 70B is preferably not less than 1.0 mm and not greater than 4.0 mm.

A ratio of the maximum groove length of the ten narrow shallow grooves 61B to 70B to the maximum width of the center land portion 11 (see FIG. 1) is preferably not less than 0.1 and not greater than 0.8. In the present embodiment, a ratio of the length of the narrow shallow groove 61B that is the longest to the maximum width of the center land portion 11 is preferably not less than 0.1 and not greater than 0.8, and more preferably not less than 0.4 and not greater than 0.5. When the maximum groove length of the narrow shallow grooves is in this range, snow traction performance can be increased. When the narrow shallow groove is short, snow traction performance cannot be obtained, and thus this is not preferable. The length of each of the narrow shallow grooves 61B to 70B is the length of the groove center line. In a case where the narrow shallow grooves 61B to 70B are curved, the length of the groove center line along the curvature is the length of each of the narrow shallow grooves.

A pitch length P2 of arrangement of the ten narrow shallow grooves 61B to 70B is preferably not less than 1.1 times and not greater than 3.0 times the groove width W2 of each of the narrow shallow grooves. When the pitch length P2 is small, a chip or a crack in a mold side is generated, and thus this is not preferable. When the pitch length P2 is large, the number of the narrow shallow grooves decreases and snow traction performance cannot be obtained, and thus this is not preferable. The pitch length P2 is more preferably not less than 1.3 times and not greater than 1.8 times.

The distance from the end portion of the block 100 that is a land portion to each of the narrow shallow grooves 61B to 70B is preferably not less than 3 mm. In other words, in FIG.

5, a distance D3 from the side 822 to the narrow shallow groove 61B that is the closest is preferably not less than 3 mm. Additionally, a distance D4 from the side 821 to each of the narrow shallow grooves 61B to 70B is preferably not less than 3 mm.

An angle θ1B formed between the groove center line of each of the narrow shallow grooves 61B to 70B and the tire circumferential direction, in other words, the extension angle of each of the narrow shallow grooves is preferably not less than 45° and not greater than 90°. When the angle is in this range, the edge components in the tire width direction can be increased, and good snow traction performance can be obtained. To obtain better snow traction performance, the angle θ1B is more preferably not less than 60° and not greater than 90°.

As described with reference to FIG. 4, similarly, as for each of the narrow shallow grooves 61B to 70B illustrated in FIG. 5, a ratio of a maximum value of the groove depth D5 from the ground contact surface of the block 100 to the groove bottom to the groove depth of the circumferential main groove 30 is preferably not less than 0.05 and not greater than 0.2. The groove depth of each of the narrow shallow grooves 61B to 70B is preferably not less than 1.0 mm and not greater than 4.0 mm. The groove depths of the narrow shallow grooves 61B to 70B may be constant or may differ. The groove depth of each of the narrow shallow grooves 61B to 70B may be constant or differ in one narrow shallow groove. The same as those described with reference to FIG. 4 applies to the width of a groove bottom of each of the narrow shallow grooves 61B to 70B, and the distance in a direction orthogonal to the extension direction of each of the narrow shallow grooves.

As illustrated in FIG. 5, the recess portion region 60B has a substantially triangular shape. Two sides of the substantially triangular shape of the recess portion region 60B are provided along the two sides 821 and 822 forming the obtuse corner portion 82. A ratio S0B/S6B of area S0B of the recess portion region 60B to the area S6B of the narrow shallow grooved region 6B is preferably not less than 1.0 and not greater than 4.0.

Returning to FIG. 1, ground contact area of the center land portion 11 is denoted by SC. The ground contact area SC is ground contact area at standard maximum air pressure and a standard maximum load by using an applicable standard rim. Additionally, total area of the narrow shallow grooved region obtained by adding the area S6A of the narrow shallow grooved region 6A and the area S6B of the narrow shallow grooved region 6B provided in the center land portion 11 is denoted by S1. In this case, a ratio S1/SC of the total area S1 to the ground contact area SC is preferably not less than 0.05 and not greater than 0.60. When the ratio S1/SC is not less than 0.05 and not greater than 0.60, rolling resistance performance, snow traction performance, and wet grip performance can be improved in a well-balanced manner. When the ratio S1/SC is less than 0.05, snow traction performance cannot be improved. When the ratio S1/SC exceeds 0.60, ground contact surface pressure of a smooth surface of the center land portion 11 is biased, and rolling resistance performance cannot be improved. Note that the ratio S1/SC is more preferably not less than 0.15 and not greater than 0.40.

Here, in FIG. 2, points at which the two sides 811 and 821 opposing along the center circumferential main groove 31 and the outermost circumferential main groove 32 of the block 100 are bisected, are denoted by midpoints MP1 and MP2. Additionally, points at which the two sides 812 and 822 opposing along the lateral grooves 40 and 40 of the block 100 are bisected, are denoted by midpoints MP3 and MP4. A straight line connecting the midpoint MP1 and the midpoint MP2 is denoted by a midline L12. A straight line connecting the midpoint MP3 and the midpoint MP4 is denoted by a midline L34. The surface of the block 100 can be divided into four regions RA, RB, RC, and RD by the midline L12 and the midline L34. In other words, the four regions RA, RB, RC, and RD are formed by the midline L12 and the midline L34.

Then, in the present embodiment, the narrow shallow grooved regions 6A and 6B are provided in the regions RA and RC among the four regions RA, RB, RC, and RD. In the block 100, the obtuse corner portion 81 of the region RA and the obtuse corner portion 82 of the region RC oppose each other. Thus, the narrow shallow grooved regions 6A and 6B are provided in the regions RA and RC diagonally opposing of the block 100. In other words, the narrow shallow grooved regions 6A and 6B are disposed without being biased in a portion of the block 100. The narrow shallow grooved regions 6A and 6B are disposed in this manner, and thus snow traction performance and rolling resistance performance can be improved in a well-balanced manner.

Here, in a case where the area of the narrow shallow grooved region 6A is not less than 10% with respect to the area of the region RA, it is assumed that the "narrow shallow grooved region is provided". Similarly, in a case where the area of the narrow shallow grooved region 6B is not less than 10% with respect to the area of the region RC, it is assumed that the "narrow shallow grooved region is provided". This is because in a case where the area is not less than 10%, an effect of improving rolling resistance performance, snow traction performance, and wet grip performance can be obtained.

On the other hand, in a case where the area of the narrow shallow grooved region 6A is less than 10% with respect to the area of the region RA, it is assumed that the "narrow shallow grooved region is not provided". Similarly, in a case where the area of the narrow shallow grooved region 6B is less than 10% with respect to the area of the region RC, it is assumed that the "narrow shallow grooved region is not provided". This is because in a case where the area is less than 10%, an effect of improving rolling resistance performance, snow traction performance, and wet grip performance cannot be obtained.

Now, in the present embodiment, among the four regions RA, RB, RC, and RD, the narrow shallow grooved region is not provided in the region RB and the region RD. However, depending on the length of the narrow shallow groove provided in the region RA or the region RC, the narrow shallow groove may extend beyond the midline L12 or the midline L34 to the region RB adjacent or the region RD adjacent. Even in a case where the narrow shallow groove extends beyond the midline L12 or the midline L34, when the area of the narrow shallow groove is not greater than 5% with respect to the area of the region RB or the region RD, it is assumed that the "narrow shallow grooved region is not provided".

Modified Examples

The edge 12 of the circumferential main groove 30 is not limited to the shape illustrated in FIG. 1, and may have a straight shape. The lateral groove 40 is not limited to the shape illustrated in FIG. 1, and may be curved or bent.

Additionally, the lateral groove 40 may not be provided in the center land portion 11. In this case, a center land portion 11 is formed as a rib shape continuous in the tire circumferential direction. As for the center land portion 11 having a rib shape, a ratio S1/SC of total area S1 of a narrow shallow grooved region to ground contact area SC of the center land portion 11 is not less than 0.05 and not greater than 0.60, and accordingly, good results are obtained as for rolling resistance performance, snow traction performance, and wet grip performance.

Examples

Tables 1 to 4 are tables showing results of performance tests of a tire according to the present embodiment.

In performance evaluation tests, a tire having a nominal tire size of 265/70R19.5 defined by the Japan Automobile Tyre Manufacturers Association Inc. (JATMA) was mounted on a rim wheel having a size of 19.5×7.50, and air pressure was adjusted to 850 kPa. In the performance evaluation tests, each of a plurality of types of test tires was mounted on a trailer shaft of a 6×4 tractor-trailer, and rolling resistance performance, snow traction performance, and wet grip performance were evaluated.

Rolling resistance performance was evaluated in accordance with ECE (Economic Commission for Europe) R117-02 (ECE Regulation No. 117 Revision 2), and a rolling resistance coefficient was calculated at a load of 4.8 kN and speed of 80 km/h by using an indoor drum testing machine (drum diameter: 1707 mm). The results are expressed as index values with a reciprocal of a rolling resistance coefficient of a conventional example described below being assigned as the reference (100). The larger index values indicate lower rolling resistance and higher rolling resistance performance.

Snow traction performance was evaluated in accordance with ECE R117-02, a distance required for acceleration from specified initial speed to termination speed on snow-covered road surfaces was measured to calculate acceleration. The calculated acceleration is expressed as an index value with a conventional example described below being assigned as the reference 100. The higher value indicates more excellent acceleration performance on snow-covered road surfaces and higher snow traction performance.

Wet grip performance was evaluated by feeling evaluation for braking and driving performance, lane changing performance, cornering performance and the like performed by a specialized test driver traveling on a test course of wet road surfaces. Wet grip performance is expressed as an index value with a conventional example being assigned as the reference (100). In the evaluation, the higher index value indicates more excellent wet grip performance. Note that when the index value is not less than "95", wet grip performance can be evaluated as being maintained.

Each of tires of Examples 1 to 29 is a tire in which narrow shallow grooved regions are provided on a land portion defined by a main groove, each of the narrow shallow grooved region includes a plurality of narrow shallow grooves that are not open to the main groove, and a ratio S1/SC is not less than 0.05 and not greater than 0.60. The tires include a tire in which the groove width of each of the narrow shallow grooves is not less than 1.0 mm and not greater than 3.0 mm and a tire that is not so; a tire in which the groove depth of each of the narrow shallow grooves is not less than 1.0 mm and not greater than 4.0 mm and a tire that is not so; a tire in which a ratio of the maximum groove depth of the narrow shallow grooves to the main groove depth is not less than 0.05 and not greater than 0.2 and a tire that is not so; a tire in which a ratio of the maximum groove length of the narrow shallow grooves to the maximum width of the land portion is not less than 0.1 and not greater than 0.8 and a tire that is not so; a tire in which a ratio of the pitch length between the narrow shallow grooves to the groove width of each of the narrow shallow grooves is not less than 1.1 and not greater than 3.0 and a tire that is not so; a tire in which the distance from an end portion of the land portion to each of the narrow shallow grooves is not less than 3 mm and a tire that is not so; a tire in which an extension angle of each of the narrow shallow grooves is not less than 45° and not greater than 90° and a tire that is not so; a tire in which a groove wall angle of each of the narrow shallow grooves is not less than 15° and not greater than 45° and a tire that is not so; a tire in which the narrow shallow grooved regions are disposed at diagonally opposing positions ("Yes" in the table) and a tire that is not so ("No" in the table); a tire in which the groove lengths of the narrow shallow grooves gradually decrease ("Yes" in the table) and a tire that is not so ("No" in the table); a tire in which the land portion has a polygonal shape including an obtuse corner portion ("Yes" in the table) and a tire that is not so ("No" in the table); a tire including the narrow shallow grooved regions differing in area ("Yes" in the table) and a tire that is not so ("No" in the table); a tire in which the narrow shallow grooved region having small area is disposed closer to a tire equator line ("Yes" in the table) and a tire that is not so ("No"" in the table); and a tire in which a ratio of area of the narrow shallow grooved region having small area to area of the narrow shallow grooved region having large area is not less than 0.3 and not greater than 0.7 and a tire that is not so.

In Table 1, a tire of a conventional example is a tire in which narrow shallow grooves are not provided in a surface of a land portion. In Table 1, a tire of a comparative example is a tire in which a serration that is open to a main groove is provided in a surface of a land portion.

As shown in Tables 1 to 4, in the case where the ratio S1/SC is not less than 0.05 and not greater than 0.60, the case where the groove width of each of the narrow shallow grooves is not less than 1.0 mm and not greater than 3.0 mm, the case where the groove depth of each of the narrow shallow grooves is not less than 1.0 mm and not greater than 4.0 mm, the case where the ratio of the maximum groove depth of the narrow shallow grooves to the main groove depth is not less than 0.05 and not greater than 0.2, the case where the ratio of the maximum groove length of the narrow shallow grooves to the maximum width of the land portion is not less than 0.1 and not greater than 0.8, the case where the ratio of the pitch length between the narrow shallow grooves to the groove width of each of the narrow shallow grooves is not less than 1.1 and not greater than 3.0, the case where the distance from the end portion of the land portion to each of the narrow shallow grooves is 3 mm or greater, the case where the extension angle of each of the narrow shallow grooves is not less than 45° and not greater than 90°, the case where the groove wall angle of each of the narrow shallow grooves is not less than 15° and not greater than 45°, the case where the narrow shallow grooved regions are disposed at diagonally opposing positions, the case where the groove lengths of the narrow shallow grooves gradually decrease, the case where the land portion has a polygonal shape including the obtuse corner portion, the case where the narrow shallow grooved regions differ in area, the case where the narrow shallow grooved region having small area is closer to the tire equator line, and the case where the ratio of the area of the narrow shallow grooved region having small area to the area of the narrow shallow grooved region having large area is not less than 0.3 and not greater than 0.7, good results were obtained for rolling resistance performance, snow traction performance, and wet grip performance.

TABLE 1-1

|  | Conventional Example | Comparative Example | Example 1 | Example 2 |
|---|---|---|---|---|
| Ratio S1/SC | No | No | 0.1 | 0.15 |
| Groove width of each of narrow shallow grooves [mm] | No | No | 1.0 | 1.5 |
| Groove depth of each of narrow shallow grooves [mm] | No | No | 1.0 | 2.0 |
| Ratio of maximum groove depth of narrow shallow grooves to main groove depth | No | No | 0.05 | 0.1 |
| Ratio of maximum groove length of narrow shallow grooves to maximum width of center land portion | No | No | 0.2 | 0.2 |
| Ratio of pitch length between narrow shallow grooves to groove width of each of narrow shallow grooves | No | No | 3 | 3 |
| Distance from end portion of land portion to each of narrow shallow grooves [mm] | No | No | 1 | 1 |
| Extension angle of each of narrow shallow grooves [°] | No | No | 45 | 45 |
| Groove wall angle of each of narrow shallow grooves [°] | No | No | 45 | 45 |
| Narrow shallow grooved regions disposed at diagonally opposing positions | No | No | No | No |
| Groove lengths of narrow shallow grooves gradually decrease | No | No | No | No |
| Land portion having polygonal shape including obtuse corner portion | No | No | No | No |
| Narrow shallow grooved regions differing in area | No | No | No | No |
| Narrow shallow grooved region having small area is close to tire equator line | No | No | No | No |
| Narrow shallow grooved region having small area/narrow shallow grooved region having large area | — | 0.3 | 0.3 | 0.3 |
| Snow traction performance | 100 | 95 | 102 | 103 |
| Rolling resistance performance | 100 | 97 | 102 | 102 |
| Wet grip performance | 100 | 92 | 95 | 96 |

TABLE 1-2

|  | Example 3 | Example 4 | Example 5 | Example 6 |
|---|---|---|---|---|
| Ratio S1/SC | 0.3 | 0.4 | 0.5 | 0.6 |
| Groove width of each of narrow shallow grooves [mm] | 3.0 | 1.0 | 1.0 | 1.0 |
| Groove depth of each of narrow shallow grooves [mm] | 3.0 | 4.0 | 4.0 | 1.0 |
| Ratio of maximum groove depth of narrow shallow grooves to main groove depth | 0.12 | 0.15 | 0.15 | 0.05 |
| Ratio of maximum groove length of narrow shallow grooves to maximum width of center land portion | 0.2 | 0.2 | 0.2 | 0.2 |
| Ratio of pitch length between narrow shallow grooves to groove width of each of narrow shallow grooves | 3 | 3 | 3 | 3 |
| Distance from end portion of land portion to each of narrow shallow grooves [mm] | 1 | 1 | 1 | 1 |
| Extension angle of each of narrow shallow grooves [°] | 45 | 45 | 45 | 45 |
| Groove wall angle of each of narrow shallow grooves [°] | 45 | 45 | 45 | 45 |
| Narrow shallow grooved regions disposed at diagonally opposing positions | No | No | No | No |
| Groove lengths of narrow shallow grooves gradually decrease | No | No | No | No |
| Land portion having polygonal shape including obtuse corner portion | No | No | No | No |
| Narrow shallow grooved regions differing in area | No | No | No | No |
| Narrow shallow grooved region having small area is close to tire equator line | No | No | No | No |
| Narrow shallow grooved region having small area/narrow shallow grooved region having large area | 0.3 | 0.3 | 0.3 | 0.3 |
| Snow traction performance | 104 | 103 | 105 | 107 |
| Rolling resistance performance | 103 | 104 | 104 | 105 |
| Wet grip performance | 97 | 96 | 98 | 100 |

TABLE 2-1

|  | Example 7 | Example 8 | Example 9 | Example 10 |
|---|---|---|---|---|
| Ratio S1/SC | 0.05 | 0.6 | 0.6 | 0.6 |
| Groove width of each of narrow shallow grooves [mm] | 1.0 | 0.5 | 1.0 | 3.0 |
| Groove depth of each of narrow shallow grooves [mm] | 4.0 | 4.0 | 4.0 | 4.0 |
| Ratio of maximum groove depth of narrow shallow grooves to main groove depth | 0.15 | 0.15 | 0.15 | 0.15 |
| Ratio of maximum groove length of narrow shallow grooves to maximum width of center land portion | 0.2 | 0.2 | 0.2 | 0.2 |
| Ratio of pitch length between narrow shallow grooves to groove width of each of narrow shallow grooves | 3 | 3 | 3 | 3 |
| Distance from end portion of land portion to each of narrow shallow grooves [mm] | 1 | 1 | 1 | 1 |
| Extension angle of each of narrow shallow grooves [°] | 45 | 45 | 45 | 45 |
| Groove wall angle of each of narrow shallow grooves [°] | 45 | 45 | 45 | 45 |
| Narrow shallow grooved regions disposed at diagonally opposing positions | No | No | No | No |
| Groove lengths of narrow shallow grooves gradually decrease | No | No | No | No |
| Land portion having polygonal shape including obtuse corner portion | No | No | No | No |
| Narrow shallow grooved regions differing in area | No | No | No | No |
| Narrow shallow grooved region having small area is close to tire equator line | No | No | No | No |
| Narrow shallow grooved region having small area/narrow shallow grooved region having large area | 0.3 | 0.3 | 0.3 | 0.3 |
| Snow traction performance | 104 | 105 | 105 | 106 |
| Rolling resistance performance | 105 | 104 | 106 | 108 |
| Wet grip performance | 98 | 99 | 98 | 100 |

TABLE 2-2

|  | Example 11 | Example 12 | Example 13 | Example 14 |
| --- | --- | --- | --- | --- |
| Ratio S1/SC | 0.6 | 0.6 | 0.6 | 0.6 |
| Groove width of each of narrow shallow grooves [mm] | 1.0 | 1.0 | 1.0 | 1.0 |
| Groove depth of each of narrow shallow grooves [mm] | 4.0 | 4.0 | 4.0 | 4.0 |
| Ratio of maximum groove depth of narrow shallow grooves to main groove depth | 0.15 | 0.15 | 0.15 | 0.15 |
| Ratio of maximum groove length of narrow shallow grooves to maximum width of center land portion | 0.3 | 0.4 | 0.5 | 0.8 |
| Ratio of pitch length between narrow shallow grooves to groove width of each of narrow shallow grooves | 3 | 3 | 3 | 3 |
| Distance from end portion of land portion to each of narrow shallow grooves [mm] | 1 | 1 | 1 | 1 |
| Extension angle of each of narrow shallow grooves [°] | 45 | 45 | 45 | 45 |
| Groove wall angle of each of narrow shallow grooves [°] | 45 | 45 | 45 | 45 |
| Narrow shallow grooved regions disposed at diagonally opposing positions | No | No | No | No |
| Groove lengths of narrow shallow grooves gradually decrease | No | No | No | No |
| Land portion having polygonal shape including obtuse corner portion | No | No | No | No |
| Narrow shallow grooved regions differing in area | No | No | No | No |
| Narrow shallow grooved region having small area is close to tire equator line | No | No | No | No |
| Narrow shallow grooved region having small area/narrow shallow grooved region having large area | 0.3 | 0.3 | 0.3 | 0.3 |
| Snow traction performance | 106 | 106 | 107 | 105 |
| Rolling resistance performance | 106 | 105 | 104 | 103 |
| Wet grip performance | 98 | 99 | 100 | 100 |

TABLE 3-1

|  | Example 15 | Example 16 | Example 17 | Example 18 |
| --- | --- | --- | --- | --- |
| Ratio S1/SC | 0.6 | 0.6 | 0.6 | 0.6 |
| Groove width of each of narrow shallow grooves [mm] | 1.0 | 1.0 | 1.0 | 1.0 |
| Groove depth of each of narrow shallow grooves [mm] | 4.0 | 4.0 | 4.0 | 4.0 |
| Ratio of maximum groove depth of narrow shallow grooves to main groove depth | 0.15 | 0.15 | 0.15 | 0.15 |
| Ratio of maximum groove length of narrow shallow grooves to maximum width of center land portion | 0.1 | 0.05 | 0.2 | 0.2 |
| Ratio of pitch length between narrow shallow grooves to groove width of each of narrow shallow grooves | 3 | 2 | 1.3 | 1.8 |
| Distance from end portion of land portion to each of narrow shallow grooves [mm] | 1 | 1 | 1 | 1 |
| Extension angle of each of narrow shallow grooves [°] | 45 | 45 | 45 | 45 |
| Groove wall angle of each of narrow shallow grooves [°] | 45 | 45 | 45 | 45 |
| Narrow shallow grooved regions disposed at diagonally opposing positions | No | No | No | No |
| Groove lengths of narrow shallow grooves gradually decrease | No | No | No | No |
| Land portion having polygonal shape including obtuse corner portion | No | No | No | No |
| Narrow shallow grooved regions differing in area | No | No | No | No |
| Narrow shallow grooved region having small area is close to tire equator line | No | No | No | No |
| Narrow shallow grooved region having small area/narrow shallow grooved region having large area | 0.3 | 0.3 | 0.3 | 0.3 |
| Snow traction performance | 105 | 102 | 103 | 105 |
| Rolling resistance performance | 104 | 106 | 107 | 108 |
| Wet grip performance | 98 | 95 | 96 | 98 |

TABLE 3-2

|  | Example 19 | Example 20 | Example 21 | Example 22 |
| --- | --- | --- | --- | --- |
| Ratio S1/SC | 0.6 | 0.6 | 0.6 | 0.6 |
| Groove width of each of narrow shallow grooves [mm] | 1.0 | 1.0 | 1.0 | 1.0 |
| Groove depth of each of narrow shallow grooves [mm] | 4.0 | 4.0 | 4.0 | 4.0 |
| Ratio of maximum groove depth of narrow shallow grooves to main groove depth | 0.15 | 0.15 | 0.15 | 0.15 |
| Ratio of maximum groove length of narrow shallow grooves to maximum width of center land portion | 0.2 | 0.2 | 0.2 | 0.2 |
| Ratio of pitch length between narrow shallow grooves to groove width of each of narrow shallow grooves | 1.2 | 1.2 | 1.2 | 1.2 |
| Distance from end portion of land portion to each of narrow shallow grooves [mm] | 1 | 3 | 3 | 3 |
| Extension angle of each of narrow shallow grooves [°] | 45 | 45 | 60 | 60 |
| Groove wall angle of each of narrow shallow grooves [°] | 45 | 45 | 45 | 30 |
| Narrow shallow grooved regions disposed at diagonally opposing positions | No | No | No | No |
| Groove lengths of narrow shallow grooves gradually decrease | No | No | No | No |
| Land portion having polygonal shape including obtuse corner portion | No | No | No | No |
| Narrow shallow grooved regions differing in area | No | No | No | No |
| Narrow shallow grooved region having small area is close to tire equator line | No | No | No | No |
| Narrow shallow grooved region having small area/narrow shallow grooved region having large area | 0.3 | 0.3 | 0.3 | 0.3 |
| Snow traction performance | 108 | 110 | 110 | 112 |
| Rolling resistance performance | 108 | 108 | 107 | 108 |
| Wet grip performance | 100 | 100 | 102 | 104 |

TABLE 4-1

|  | Example 23 | Example 24 | Example 25 | Example 26 |
| --- | --- | --- | --- | --- |
| Ratio S1/SC | 0.6 | 0.6 | 0.6 | 0.6 |
| Groove width of each of narrow shallow grooves [mm] | 1.0 | 1.0 | 1.0 | 1.0 |
| Groove depth of each of narrow shallow grooves [mm] | 4.0 | 4.0 | 4.0 | 4.0 |

TABLE 4-1-continued

|  | Example 23 | Example 24 | Example 25 | Example 26 |
|---|---|---|---|---|
| Ratio of maximum groove depth of narrow shallow grooves to main groove depth | 0.15 | 0.15 | 0.15 | 0.15 |
| Ratio of maximum groove length of narrow shallow grooves to maximum width of center land portion | 0.2 | 0.2 | 0.2 | 0.2 |
| Ratio of pitch length between narrow shallow grooves to groove width of each of narrow shallow grooves | 1.2 | 1.2 | 1.2 | 1.2 |
| Distance from end portion of land portion to each of narrow shallow grooves [mm] | 3 | 3 | 3 | 3 |
| Extension angle of each of narrow shallow grooves [°] | 60 | 60 | 90 | 90 |
| Groove wall angle of each of narrow shallow grooves [°] | 15 | 15 | 15 | 15 |
| Narrow shallow grooved regions disposed at diagonally opposing positions | No | Yes | Yes | Yes |
| Groove lengths of narrow shallow grooves gradually decrease | No | Yes | Yes | Yes |
| Land portion having polygonal shape including obtuse corner portion | No | No | No | Yes |
| Narrow shallow grooved regions differing in area | No | No | No | No |
| Narrow shallow grooved region having small area is close to tire equator line | No | No | No | No |
| Narrow shallow grooved region having small area/narrow shallow grooved region having large area | 0.3 | 0.3 | 0.3 | 0.3 |
| Snow traction performance | 114 | 115 | 115 | 116 |
| Rolling resistance performance | 108 | 108 | 108 | 108 |
| Wet grip performance | 106 | 106 | 107 | 108 |

TABLE 4-2

|  | Example 27 | Example 28 | Example 29 |
|---|---|---|---|
| Ratio S1/SC | 0.6 | 0.6 | 0.6 |
| Groove width of each of narrow shallow grooves [mm] | 1.0 | 1.0 | 1.0 |
| Groove depth of each of narrow shallow grooves [mm] | 4.0 | 4.0 | 4.0 |
| Ratio of maximum groove depth of narrow shallow grooves to main groove depth | 0.15 | 0.15 | 0.15 |
| Ratio of maximum groove length of narrow shallow grooves to maximum width of center land portion | 0.2 | 0.2 | 0.2 |
| Ratio of pitch length between narrow shallow grooves to groove width of each of narrow shallow grooves | 1.2 | 1.2 | 1.2 |
| Distance from end portion of land portion to each of narrow shallow grooves [mm] | 3 | 3 | 3 |
| Extension angle of each of narrow shallow grooves [°] | 90 | 90 | 90 |
| Groove wall angle of each of narrow shallow grooves [°] | 15 | 15 | 15 |
| Narrow shallow grooved regions disposed at diagonally opposing positions | Yes | Yes | Yes |
| Groove lengths of narrow shallow grooves gradually decrease | Yes | Yes | Yes |
| Land portion having polygonal shape including obtuse corner portion | Yes | Yes | Yes |
| Narrow shallow grooved regions differing in area | Yes | Yes | Yes |
| Narrow shallow grooved region having small area is close to tire equator line | No | Yes | Yes |
| Narrow shallow grooved region having small area/narrow shallow grooved region having large area | 0.3 | 0.3 | 0.7 |
| Snow traction performance | 117 | 119 | 120 |
| Rolling resistance performance | 108 | 108 | 108 |
| Wet grip performance | 109 | 111 | 112 |

The invention claimed is:

1. A tire, comprising:
a narrow shallow grooved region on a land portion defined by a main groove;
the narrow shallow grooved region comprising a plurality of narrow shallow grooves that are not open to the main groove,
a ratio S1/SC of total area S1 of the narrow shallow grooved region to ground contact area SC of the land portion being not less than 0.05 and not greater than 0.60, and
the plurality of narrow shallow grooves differing from each other in a length.

2. The tire according to claim 1, wherein a groove width of each of the plurality of narrow shallow grooves is not less than 1.0 mm and not greater than 3.0 mm.

3. The tire according to claim 1, wherein a groove depth of each of the plurality of narrow shallow grooves is not less than 1.0 mm and not greater than 4.0 mm.

4. The tire according to claim 1, wherein a ratio of a maximum groove depth of the plurality of narrow shallow grooves to a groove depth of the main groove is not less than 0.05 and not greater than 0.2.

5. The tire according to claim 1, wherein a ratio of a maximum groove length of the plurality of narrow shallow grooves to a maximum width of the land portion is not less than 0.1 and not greater than 0.8.

6. The tire according to claim 1, wherein a pitch length of the plurality of narrow shallow grooves is not less than 1.1 times and not greater than 3.0 times the groove width of each of the plurality of narrow shallow grooves.

7. The tire according to claim 1, wherein a distance from an end portion of the land portion to each of the plurality of narrow shallow grooves is not less than 3 mm.

8. The tire according to claim 1, wherein an angle formed between a groove center line of each of the plurality of narrow shallow grooves and a tire circumferential direction is not less than 45° and not greater than 90°.

9. The tire according to claim 1, wherein in a cross-sectional shape along a direction orthogonal to an extension direction of each of the plurality of narrow shallow grooves, an angle of a groove wall of each of the plurality of narrow shallow grooves with respect to a tire radial direction is not less than 15° and not greater than 45°.

10. The tire according to claim 1, wherein
a recess portion region having a depth in a tire radial direction from a ground contact surface of the land portion is provided, and the plurality of narrow shallow grooves are provided in an inner side of the recess portion region.

11. The tire according to claim 1, wherein
a lug groove extending through the land portion in a tire width direction is provided, and the plurality of narrow shallow grooves are provided in diagonally opposing regions of a block defined by the main groove and the lug groove, among four regions formed by a midline connecting midpoints at which two opposing sides along the main groove of the block are bisected and a midline connecting midpoints at which two opposing sides along the lug groove of the block are bisected.

12. The tire according to claim 11, wherein
a longest narrow shallow groove of the plurality of narrow shallow grooves is disposed closer to a side along the lug groove than a shortest narrow shallow groove, and the plurality of narrow shallow grooves are arranged having lengths gradually decreasing from the longest narrow shallow groove to the shortest narrow shallow groove.

13. The tire according to claim 11, wherein
the narrow shallow grooved region has a substantially triangular shape, and
the block has a polygonal shape having an obtuse corner portion, and
two sides of the substantially triangular shape of the narrow shallow grooved region are provided along two sides forming the obtuse corner portion.

14. The tire according to claim 13, wherein
the block has other obtuse corner portion at a position opposing a position of the obtuse corner portion, and
two sides of other narrow shallow grooved region having a substantially triangular shape are provided along two sides forming the other obtuse corner portion.

15. The tire according to claim 14, wherein
the narrow shallow grooved region and the other narrow shallow grooved region differ from each other in area, and
in the block, the narrow shallow grooved region having small area is provided at a position closer to a tire equator line than the narrow shallow grooved region having large area.

16. The tire according to claim 15, wherein
a ratio of area of the narrow shallow grooved region having the small area to area of the narrow shallow grooved region having the large area is not less than 0.3 and not greater than 0.7.

17. A tire, comprising:
a narrow shallow grooved region on a land portion defined by a main groove;
the narrow shallow grooved region comprising a plurality of narrow shallow grooves that are not open to the main groove,
a ratio S1/SC of total area S1 of the narrow shallow grooved region to ground contact area SC of the land portion being not less than 0.05 and not greater than 0.60,
a recess portion region having a depth in a tire radial direction from a ground contact surface of the land portion being provided, and
the plurality of narrow shallow grooves being provided in an inner side of the recess portion region.

* * * * *